G. W. BOWERS.
MULTIPLE MOLD.
APPLICATION FILED SEPT. 15, 1916.
1,229,873.
Patented June 12, 1917.
2 SHEETS—SHEET 1.
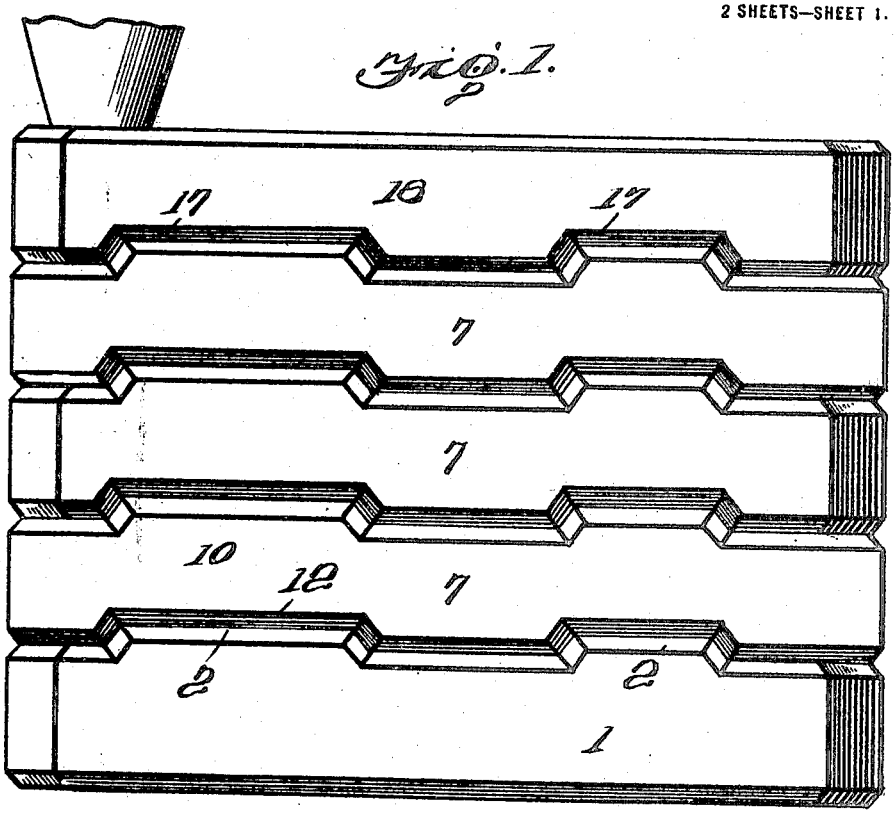
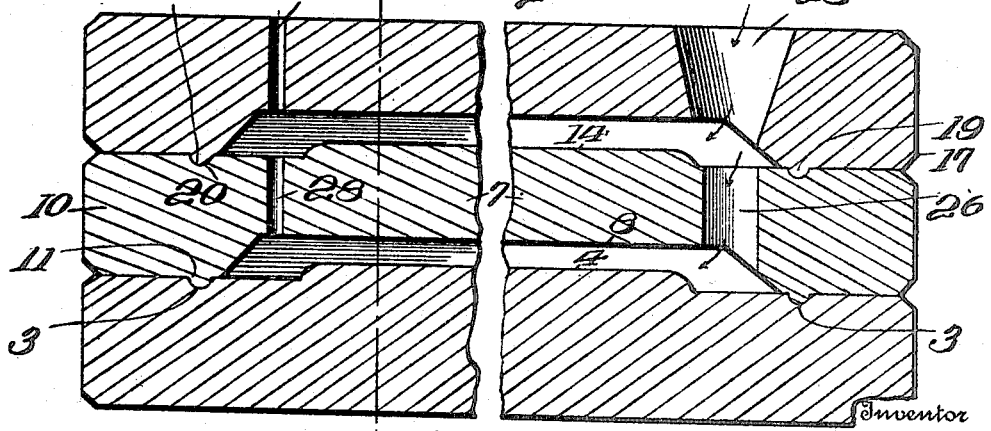
Witnesses
Lloyd R. Cornwall.
Inventor
G. W. Bowers.
By E. B. Stuckey
Attorney

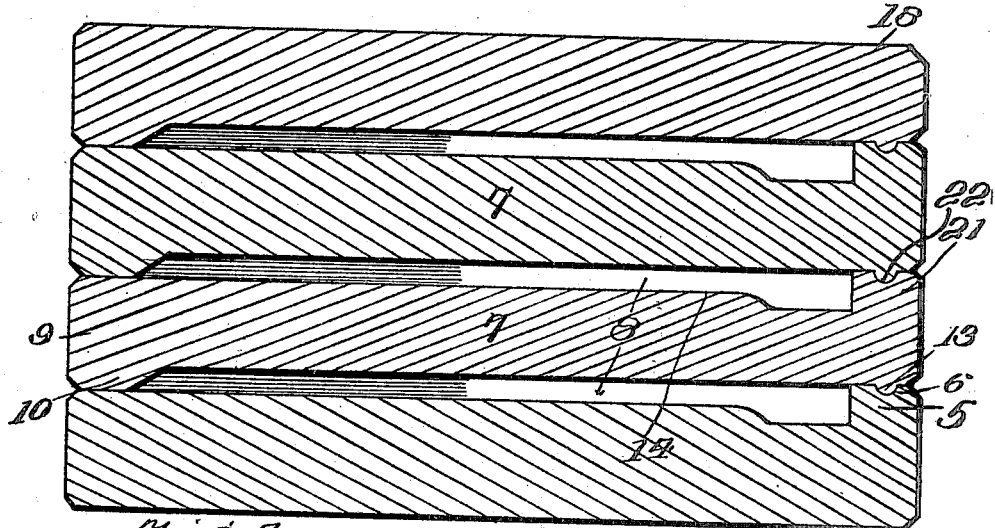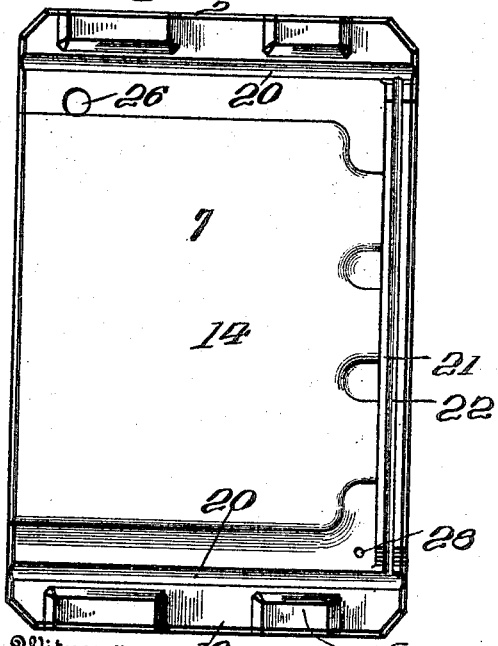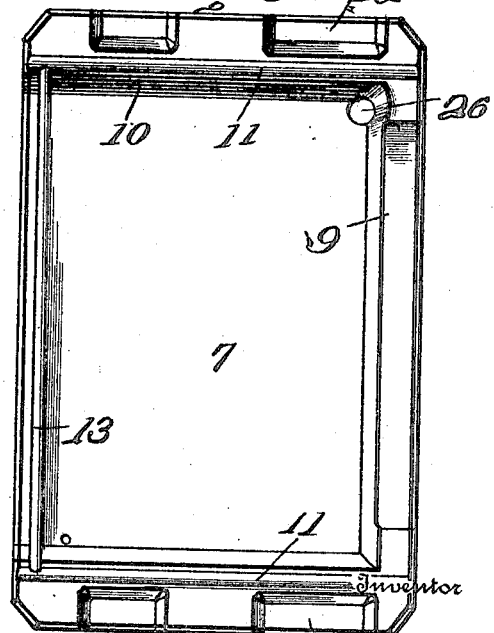

UNITED STATES PATENT OFFICE.

GEORGE W. BOWERS, OF MANNINGTON, WEST VIRGINIA.

MULTIPLE MOLD.

1,229,873. Specification of Letters Patent. Patented June 12, 1917.

Application filed September 15, 1916. Serial No. 120,348.

*To all whom it may concern:*

Be it known that I, GEORGE W. BOWERS, a citizen of the United States, residing at Mannington, in the county of Marion and State of West Virginia, have invented certain new and useful Improvements in Multiple Molds, of which the following is a specification, reference being had therein to the accompanying drawing.

This invention relates to certain new and useful improvements in multiple molds, and is especially adapted to be used for forming tank backs out of semi-porcelain, china, vitreous china, or clay, the object being to provide a multiple mold formed of a base section and a plurality of intermediate sections in connection with the top section so arranged that when assembled one above the other a plurality of mold cavities will be formed each intermediate section having a runner through which the material is carried from the pouring hole in the upper section so that in filling the molds, the lower cavity will be filled first, the next upper cavity second, and so on until all of the mold cavities have been filled thereby saving time in molding articles of this character.

Another and further object of the invention is to provide a multiple mold in which the intermediate sections are formed identical whereby any number of intermediate sections can be used so as to form the desired number of tank backs at one pouring.

Another and further object of the invention is to provide a multiple mold in which each of the intermediate sections are provided with a cavity upon its under face which when in position upon the adjacent intermediate section forms a mold cavity, the upper face of each intermediate section being embossed so as to form the tank back of the desired shape.

Another and further object of the invention is to provide a multiple mold which is preferably formed of plaster Paris in which the sections are interlocked together in such a manner that they can be readily assembled and taken apart in order to build up a complete mold out of a number of sections so that a number of tank backs can be formed.

Other and further objects and advantages of the invention will be hereinafter set forth and the novel features thereof defined by the appended claims.

In the drawings,

Figure 1 is an end elevation of a mold constructed in accordance with my invention;

Fig. 2 is a longitudinal vertical section of a mold formed of a base section, intermediate section, and a top section;

Fig. 3 is a vertical section taken at right angles to that of Fig. 2 showing two intermediate sections employed;

Fig. 4 is a top plan view of one of the intermediate sections; and

Fig. 5 is an inverted plan of the same.

Like numerals of reference refer to like parts in the several figures of the drawing.

In carrying out my invention I employ a base section 1 which is preferably rectangular in shape having at its ends vertically disposed lugs 2 and transversely arranged grooves 3, the central portion being embossed as shown at 4 so as to give the desired shape to the tank back being formed as will be hereinafter fully described.

Extending along one of the side edges of a base is a vertically disposed flange 5 which is provided with a groove 6 as clearly shown in Fig. 3.

Mounted upon the base section 1 is an intermediate section 7 and in the various figures of the drawing I have shown a number of these intermediate sections employed in order to produce a mold with a number of mold cavities, and each of these intermediate sections is formed identical and the description of one will be sufficient for all. The intermediate section is provided in its under face with a recess 8 formed by marginal flanges extending around three of its sides, the side flange 9 being being preferably cut out to receive the embossed portion of the base section or abutting intermediate section, the end flanges 10 being provided with tongues 11 adapted to extend in the grooves 3 of the base section or intermediate section as the case may be, said flanges also being provided with recesses 12 to receive the lugs 2 so as to interlock the sections together. The under face along the other edges is provided with a depending tongue 13 which extends into the groove 6 of the base or intermediate section as will be hereinafter fully described.

The upper face of the intermediate section is provided with an embossed portion 14 and vertically disposed lugs 15 at its ends which are adapted to extend into recesses 17 formed in the end flanges of the top section 18, said flanges being provided with tongues 19 extending into grooves 20 formed in the upper face of the intermediate section 7. Extending upwardly from one of the side edges of the intermediate section is a flange 21 which is provided with a groove 22 adapted to receive a tongue formed on the top section along one of its side edges.

The upper or top section is provided with a pouring hole 25 which communicates with the mold cavity formed by the intermediate section and top section, each of the intermediate sections being provided with a runner 26 which allows the material being poured through the pouring hole 25 to pass down to the lower mold cavity of the multiple mold and gradually fill the superposed cavities. The top section is provided with an air vent 27 and each of the intermediate sections 7 is provided with a vertical bore 28 forming a vent so as to allow the escape of air and gas as the material is poured into the mold cavities.

From the foregoing description, it will be seen that I have provided a mold which is formed of a plurality of sections composed of a base section, a series of an intermediate section, and a top section, all of the intermediate sections being so constructed that any number of these sections can be employed when arranged in superposed position to form a plurality of mold cavities, the top section being so formed that the same cooperates with the upper intermediate section which forms the top of the upper mold cavity, each intermediate section being formed identical so that one intermediate section can be used in connection with the bottom and top section so as to produce two mold cavities. A series of intermediate sections can be arranged one above the other in order to produce a plurality of mold cavities into which the material for forming the tank backs is poured through the pouring hole in the top section and carried through runners formed in the intermediate sections into the mold cavities.

I claim:

1. A multiple mold, composed of a rectangular base section having vertically disposed lugs at its ends and a vertically disposed flange along one of its edges, an intermediate section having a recess in its under face formed of marginal flanges, said intermediate section being provided with recesses to receive said lugs, and vertically disposed lugs, and a top section having a recess in its under face and provided with depending lugs fitting in the recesses of the intermediate section, said top section being provided with a pouring hole and an air vent, the intermediate section being provided with a runner and an air vent in alinement with the air vent and pouring hole of the top section.

2. A mold of the kind described formed of a plurality of superposed plaster Paris slabs comprising a base section, an intermediate section and a top section, having tongues and grooves and lugs and recesses for positioning said sections, said top section and intermediate section having recesses in their under faces, the bottom section and intermediate section being provided with embossed portions on their upper faces, said top section having a pouring hole and an air vent, said intermediate section having an air vent in alinement with the air vent of the top section, and a runner formed in the intermediate section in vertical alinement of the pouring hole in the top section.

In testimony whereof I hereunto affix my signature in the presence of two witnesses.

GEORGE W. BOWERS.

Witnesses:
FRANK W. BOWERS,
C. DILWORTH.

Copies of this patent may be obtained for five cents each, by addressing the "Commissioner of Patents, Washington, D. C."